United States Patent [19]
Coleman

[11] Patent Number: 5,876,633
[45] Date of Patent: Mar. 2, 1999

[54] ELECTROCHROMIC METAL OXIDES

[75] Inventor: James Patrick Coleman, Maryland Heights, Mo.

[73] Assignee: Monsanto Company, St. Louis, Mo.

[21] Appl. No.: 721,506

[22] Filed: Sep. 26, 1996

Related U.S. Application Data

[60] Provisional application No. 60/009,226 Dec. 26, 1995.

[51] Int. Cl.[6] .................................................. H01B 1/08
[52] U.S. Cl. ..................................... 252/520.1; 252/518.1
[58] Field of Search .............................. 252/518.1, 520.1, 252/521.5; 428/402; 75/255; 420/557, 562

[56] References Cited

U.S. PATENT DOCUMENTS

| | | | |
|---|---|---|---|
| 3,978,007 | 8/1976 | Giglia et al. | 252/506 |
| 4,160,241 | 7/1979 | Shimizu et al. | 340/763 |

(List continued on next page.)

FOREIGN PATENT DOCUMENTS

| | | | |
|---|---|---|---|
| 966923 | 4/1975 | Canada | 345/55 |
| 1154135 | 6/1983 | Canada | G02F 1/17 |
| 0193978 | 9/1986 | European Pat. Off. | C25D 13/08 |
| 0333700 | 9/1989 | European Pat. Off. | H01M 4/00 |
| 0341554 | 11/1989 | European Pat. Off. | D06M 11/12 |
| 359569 | 3/1990 | European Pat. Off. . | |
| 386932 | 9/1990 | European Pat. Off. . | |
| 0403180 | 12/1990 | European Pat. Off. | C09C 1/62 |
| 441427 | 8/1991 | European Pat. Off. . | |
| 0486387 | 5/1992 | European Pat. Off. | G02F 1/153 |
| 587105 A2 | 3/1994 | European Pat. Off. . | |
| 627385 | 7/1994 | European Pat. Off. . | |
| 38109293 | 10/1988 | Germany | G02F 1/17 |
| 59-113422 | 6/1984 | Japan | G02F 1/17 |
| 0226064 | 12/1984 | Japan . | |
| 0099174 | 6/1985 | Japan . | |
| 0181 | 9/1985 | Japan . | |

(List continued on next page.)

OTHER PUBLICATIONS

Nomura et al. J. Macromol. Sci.–Chem., A26(2&3), pp. 593–608 (1989), Electrochemical and Electrochromic Properties of Polymer Complex Films Composed of Polytetramethyleneviologen and Poly–[p–styrenesulfonic Acid] Containing a Conductive Powder (No Month).

Masumi, Proc. of SID 1982, vol. 23/4, pp. 245–248, "Response–Improved Electrochromic Display Based on Organic Materials" 1982 (No Month).

Orel et al., J. Electrochem. Soc. vol. 141, No. 9, pp. L127–L130, Sep., 1994, "Electrochemical and Structural Properties of $SnO_2$ and $Sb:SnO_2$ Transparent Electrodes with Mixed Electronically Conductive and Ion–Storage Charateristics".

*Primary Examiner*—Mark Kopec
*Attorney, Agent, or Firm*—Howell & Haferkamp, L.C.

[57] ABSTRACT

Tin oxide doped with an electrochemically effective amount of a metal, e.g., antimony or niobium, which provides a color change when the doped tin oxide is exposed to an electrochemical potential in the presence of mobile ions. Particles of electrochromic doped tin oxide, e.g., coated on a white or pastel pigment substrate, have a contrast ratio greater than 1.2, where contrast ratio is a measure of electrochromic functionality of a material and is the ratio of reflectance of the material in an oxidized state to the color of the material in a reduced state and where color is a photodiode measurement of the value of light reflected off the oxidized or reduced material from a constant source of light shining on the material. Such doped tin oxide-containing particles are useful as electrochromic material in display devices, and may be employed in display devices that advantageously exhibit a linear or nearly linear relationship between stored electrical charge and voltage, and which also exhibit linear or nearly linear optical characteristics as a function of voltage. Electrochromically active materials made from metal oxides and doped with substances other than antimony and niobium have also been found with high contrast ratios. These additional doped materials may be substituted for electrochromically active antimony-doped tin oxide in electrochromic displays.

5 Claims, 7 Drawing Sheets

U.S. PATENT DOCUMENTS

| | | | |
|---|---|---|---|
| 4,280,754 | 7/1981 | Yano et al. | 350/357 |
| 4,342,031 | 7/1982 | Lapeyre | 340/756 |
| 4,354,741 | 10/1982 | Mano et al. | 350/357 |
| 4,465,339 | 8/1984 | Baucke et al. | 350/357 |
| 4,550,982 | 11/1985 | Hirai | 350/357 |
| 4,596,722 | 6/1986 | Warszawski | 427/108 |
| 4,652,090 | 3/1987 | Uchikawa et al. | 350/357 |
| 4,746,200 | 5/1988 | Kamigaki | 350/357 |
| 4,750,817 | 6/1988 | Sammells | 350/357 |
| 4,810,067 | 3/1989 | Demiryont | 350/357 |
| 4,824,221 | 4/1989 | Endo et al. | 350/357 |
| 4,893,903 | 1/1990 | Thaker et al. | 350/331 |
| 4,902,110 | 2/1990 | Green | 350/357 |
| 4,966,675 | 10/1990 | Steininger | 209/490 |
| 5,011,582 | 4/1991 | Oshikawa et al. | 204/140 |
| 5,078,480 | 1/1992 | Warszawski | 359/265 |
| 5,104,583 | 4/1992 | Richardson | 252/518 |
| 5,189,549 | 2/1993 | Leventis et al. | 359/271 |
| 5,216,536 | 6/1993 | Agrawal et al. | 359/274 |
| 5,227,252 | 7/1993 | Murayama et al. | 428/690 |
| 5,284,205 | 2/1994 | Cahill | 428/328 |
| 5,413,739 | 5/1995 | Coleman | 252/511 |
| 5,442,478 | 8/1995 | Lampert et al. | 359/273 |
| 5,500,759 | 3/1996 | Coleman | 359/270 |
| 5,545,250 | 8/1996 | Bergmann et al. | 75/252 |
| 5,707,556 | 1/1998 | Babinec et al. | 252/518 |

FOREIGN PATENT DOCUMENTS

| | | | |
|---|---|---|---|
| 0229964 | 11/1985 | Japan . | |
| 62-044719 | 2/1987 | Japan | G02F 1/17 |
| 62-049333 | 3/1987 | Japan | G02F 1/17 |
| 63-199325 | 8/1988 | Japan . | |
| 63-207856 | 8/1988 | Japan | C08L 101/00 |
| 1107135 | 4/1989 | Japan | G01N 21/77 |
| 3275658 | 11/1989 | Japan . | |
| 07133374 A2 | 5/1995 | Japan . | |
| 61-185730 | 8/1996 | Japan | G02F 1/17 |
| WO 87/01515 | 3/1987 | WIPO | H01M 2/02 |
| WO 92/18896 | 10/1992 | WIPO | G02F 1/155 |
| WO 92/19694 | 11/1992 | WIPO | C09K 9/02 |
| WO 93/21557 | 10/1993 | WIPO | G02F 1/15 |
| WO 93/21558 | 10/1993 | WIPO | G02F 1/155 |
| WO 93/22707 | 11/1993 | WIPO | G02F 1/53 |
| WO 94/15246 | 7/1994 | WIPO | G02F 1/15 |

ELECTROCHROMIC METAL OXIDES

This application claims the benefit of U.S. Provisional application Ser. No. 60/009,226, filed Dec. 26, 1995.

BACKGROUND OF THE INVENTION

1. Field of the Invention

Disclosed herein are novel electrochromic materials comprising doped metal oxide-containing particles having a high contrast and methods of making and using such materials, e.g., in novel electrochromic devices, wherein at least some of such devices are characterized by a substantially linear relationship between an amount of electrical charge stored and a voltage between terminals of the electrochromic device.

2. Description of the Prior Art

Doped tin oxides are known among metal oxides for their relative transparency and high electrical conductivity. These properties are advantageously employed in a variety of electro-optical applications, e.g., providing transparent conductive coatings on particles or surfaces. One such application is the fabrication of transparent electrodes on electrochromic display devices which typically have an electrolyte material in contact with an electrochromic material so that an electrochromic effect is generated when an electric potential is applied across the interface of the two materials. When electrodes are provided on both sides of the materials, e.g., in sandwich-like structure, the electrode on at least one side of the display laminate needs to be relatively transparent to permit observation of the electrochromic effect. In such devices typical electrochromic materials include tungsten oxide, Prussian Blue, polyaniline and viologens. Transparent electrodes have been fabricated by vapor deposition of doped tin oxide coatings on glass or plastic substrates.

Although doped tin oxides have been employed as transparent conductors in electrochromic devices, it appears that the possibility that doped tin oxide might be useful as a practical electrochromic material has not been discovered. For instance, Orel et al. reported in the Journal of the Electrochemical Society, Vol. 141, page L127 (1994) that a film of ATO exhibited a change in light reflectance between a reduced and oxidized state of less than 5%, which corresponds to a contrast ratio (as defined hereinbelow) of less than 1.05. Because such a change in color is not readily discernable to the typical human eye, it has not been recognized or discovered that doped tin oxides have useful electrochromic properties.

A variety of dopants are used to make conductive metal oxides, some of which, e.g., fluorine-doped tin oxide and tin-doped indium oxide (ITO), have not heretofore been known to produce materials exhibiting any useful electrochromic effect. Similarly, ATO, when provided in film form, also does not exhibit any useful electrochromic effect.

Furthermore, in prior art electrochromic devices, Faradaic processes, e.g., metal deposition, takes place, causing the prior art devices to have a non-linear relationship between charge and voltage. These Faradaic processes cause charge to increase rapidly after a certain threshold voltage value is reached, as discussed by B. Conway in The Electrochemical Society Proceedings, Vol. 95-29, "Electrochemical Capacitors," p. 15, a phenomenon that increases the difficulty in controlling electrochromic displays, because neither charge nor color is a linear function of voltage in such a display. It would be desirable to provide an electrochromic display free from electrical effects caused by Faradaic processes, so that an amount of charge injected into the display would be directly proportional to the applied voltage over a useful voltage range. To the extent that the color change of the display would also be directly and linearly related to the amount of injected charge, the color change, as well, would be linearly related to voltage, which would permit the use of simplified display control circuitry.

SUMMARY OF THE INVENTION

When select doped metal oxides, e.g., ATO and niobium-doped tin oxide, are provided in particle form in an electrochromic generating environment, a surprising electrochromic effect is achieved. Thus, this invention is directed, in part, to the surprising discovery that certain of the conductive doped metal oxides can be useful high contrast electrochromic materials and to electrochromic devices employing such electrochromic doped oxides.

This invention provides novel electrochromic materials comprising doped metal oxide having a high contrast ratio between different oxidation states. These high contrast electrochromic metal oxide materials are doped with an electrochromically-effective amount of an ion that provides a color change when exposed to ion transfer in an electric field. Preferred dopants for tin oxide are antimony, niobium, and fluorine. Mixed tin(II)–tin(IV) oxide has also been found useful, as has tin-doped indium oxide.

The invention also provides methods of making such electrochromic metal oxide materials, for instance in the case of antimony-doped tin oxide materials by employing higher levels of antimony than commonly used in conductive tin oxide applications.

This invention also provides methods of advantageously using such electrochromic metal oxide materials, e.g., in display devices. More particularly, this invention also provides a method of producing an electrochromic effect by applying an electrochemical potential to doped metal oxide in contact with mobile ions.

This invention also provides particulate antimony-doped tin oxide that is oxidized or reduced to provide a powder resistivity which is at least two times the powder resistivity of a base antimony tin oxide compound. Such resistive antimony-doped tin oxide is also uniquely colored as compared to analogous tin oxides that are highly conductive and transparent.

This invention also provides electrochromic devices comprising such high contrast, electrochromic metal oxide materials. Such devices are typically laminate structures comprising a layer of electrochromic material in contact with an ion-supplying electrolyte layer.

In another significant aspect of the invention, it has been surprisingly discovered that when the conductive metal oxides of the present invention are provided in high surface area particulate form in an electrochromic device, this device shows a nearly linear relationship between applied voltage and both charge and electro-optic effect within a range of voltages useful for electrochromically switching between a substantial contrast range of the device. As such, a device made in accordance with the invention could employ greatly simplified control circuitry, compared to that required by present electrochromic displays, to exploit available ranges of electrochromic effects.

Therefore, according to another aspect of this invention, there is provided an electrochromic metal oxide device that provides substantially linear relationships between applied charge, voltage, and optical effect.

DETAILED DESCRIPTION OF PREFERRED EMBODIMENTS

Percentages expressed herein as "%" are mole percent unless indicated otherwise, e.g. weight percent is expressed as "wt %".

As used herein "powder resistivity" means an electrical resistivity measured with a two probe apparatus on powder compressed at high pressure in a confined by defined space. The two probes of the apparatus comprise metal, e.g. stainless steel, rods about 6.5 mm in diameter and extending about 15 mm from the center of a plate, e.g. a disc that is 9 mm thick and 5 cm in diameter; the disks are electrically connected to an ohm-meter. The overall length of the extended rods is slightly longer than the length of a hole in a non-conducting, e.g., acrylic polymer, cylinder reinforced by a surrounding metal, e.g. aluminum, sleeve and having a central bore that is slightly larger than the diameter of the rods. To measure powder resistivity, the cylinder is mounted on one disc with the rod inserted into the bore; the open bore is partially filled with particulate material which is compressed by pressing the second rod into the bore. Resistance is measured by an ohm-meter when the pressure on the powder is 845 kilograms per square centimeter (which is equivalent to 12,000 psi). At that pressure the height of compressed particles in the bore ($H_p$) is determined by measuring the space between the discs in centimeters with a micrometer. The cross sectional area of the rod ($A_r$) is 0.3318 square centimeters. Powder resistivity ($\rho$) is determined by multiplying the measured resistance by the ratio of cross sectional area ($A_r$) to height of compressed particles in the bore ($H_p$).

As used herein the terms "oxidized" and "reduced" mean changing the number of electrons associated with a valence state of a material by chemical or electrochemical means. An oxidized metal oxide is a material that has fewer electrons than the same metal oxide material in its natural state. Conversely, a reduced metal oxide is a material that has more electrons than the same metal oxide material in its natural state. A common chemical reducing agent is sodium borohydride which is capable of putting electrons accompanied by ions, e.g. protons or other cations such as sodium, lithium, etc., into a tin oxide lattice. In a reduced state, e.g. when saturated with electrons, doped tin oxide has a darker color and lower conductivity. Interestingly, the conductivity of both reduced and oxidized doped tin oxide is significantly lower than the conductivity of doped tin oxide in the natural state. The conductivity of oxidized doped tin oxide is lower because the number of electron carriers is substantially lower. The conductivity of reduced doped tin oxide is lower because the material is so saturated with electrons that electron mobility is impaired. To achieve an electrochromic effect it is believed that it is necessary to cause an electrochromic-generating oxidation or reduction at the surface of the electrochromic material, e.g. typically by applying an electrical potential of 1 volt or less to cause cations and electrons to migrate into or out of the surface layer of the electrochromic material.

As used herein the term "contrast ratio" (CR) describes the difference in color of a material in oxidized and reduced states. More particularly, contrast ratio means the ratio of reflectance of a material in an electrochemically oxidized state to the reflectance of the material in an electrochemically reduced state, where reflectance is a photo diode measurement of the value of light reflected off the oxidized or reduced material from a constant source of light shining on the material. A material having a CR=1 would have no electrochromic effect, that is the light reflected from the material in a reduced state would be immeasurably different from the light reflected from the material in an oxidized state. The electrochromic metal oxide materials used in the electrochromic devices of this invention have a CR of at least 1.2 or higher, say at least 1.4 or 1.6. Preferred electrochromic metal oxide materials of this invention have a CR of at least 1.8 or higher, say at least 2 or 3. More preferred electrochromic metal oxide materials of this invention have a CR of at least 4 of higher, say at least 4.5 or 5.

A material is said to be in an oxidized state when it has fewer electrons than in the reduced state. For instance, in oxides, antimony has two stable oxidation states with two or zero electrons in the outer shell. These are denoted as Sb(III) and Sb(V). In the mixed oxide compound ATO, as naturally formed, the antimony atoms in the metal oxide lattice are at an oxidation state intermediate between III and V with electrons from the antimony in a tin 5S electron orbital based conduction band. In ATO the natural blue gray color is believed to be due to a charge transfer absorption band.

For electrochromic metal oxides, e.g. ATO, I have now shown that the wide ranges of color and conductivity in metal oxide powders are possible for a given ratio of dopant to base metal by changing the oxidation state of the material, i.e. changing the number of electrons. For instance, in the case of ATO, the number of delocalized electrons associated with the antimony can be changed by either chemical or electrochemical oxidation or reduction.

In particular, in oxidized ATO electrons are removed from the material effectively transforming the antimony to a species closer to antimony V which has no free electrons and essentially no color; there are no delocalized electrons remaining to undergo charge transfer. Conversely, in reduced ATO there is an increase in delocalized electrons in the metal oxide, resulting in more charge transfer light absorption and hence more color. In a natural state, e.g. without exposure to an electrical potential causing oxidation or reduction, natural ATO has an inherently translucent blue gray color where the intensity and hue of the color is a function of the antimony in the mixed metal oxide.

In describing dopants it is useful to use mole ratios of metal components in the tin oxide material. Unless otherwise indicated, the amount of dopant in a tin oxide will be expressed as a mole ratio. For example, 6% ATO describes tin oxide doped with antimony where the number of moles of antimony as a percent of the combined moles of antimony and tin is 6%.

Factors affecting contrast ratio of a doped metal oxide include the amount of dopant and the covering power, i.e. ability to absorb light, of optional adjuvant materials such as pigmented particles mixed with doped metal oxide particles or providing a substrate for a doped metal oxide coating.

Although doped tin oxide is typically considered transparent or translucent, especially when applied as a film, particular doped tin oxide can have perceptible color, perhaps due at least in part to the interaction of light with the particle. Thus, factors affecting color within the realm of routine experimentation include particle size, amount of dopant, crystallite size and dimensional thickness of the doped tin oxide material. For instance, particles of 10% ATO have what appears to be a dark gray color. While the dark gray-colored, doped tin oxide can be used in electrochromic devices, the contrast is often not optimal since reduced tin oxides generally get darker in color, leaving little room in the chromatic spectrum for adequate contrast in display images. It has been discovered, however, that when doped tin oxide is used in combination with a light-colored pigment substrate, that the lighter color of the pigment imparts a lighter natural color that provides significantly greater contrast when the doped tin oxide is reduced and/or oxidized. Thus, in providing material for use in electrochromic displays, it is often preferred to provide the doped tin oxide with a light-colored adjuvant, e.g. at white or pastel colored pigment, that will provide a light background color visible through a generally transparent or at least translucent, doped tin oxide. The doped tin oxide and pigment can be provided as a mixture of particles. It is preferable to provide the doped tin oxide as a coating on, or in admixture with, a light colored adjuvant substrate. Useful adjuvant pigments include titanium dioxide ($TiO_2$), mica, aluminum borate, silica, barium sulfate and alumina. When doped tin oxide is used in a mixture with pigment particles, the pigment material is preferably less electrochemically active in aqueous electrolytes than is the doped tin oxide. When used with a light colored pigment adjuvant as a substrate for doped tin oxide, the amount of doped tin oxide in the coating is not critical so long as the particle is sufficiently conductive. Unless otherwise indicated, the relative amounts of doped tin oxide and pigment will be expressed as weight ratio, e.g. a weight ratio of doped tin oxide to pigment substrate in the range of 1:4 to about 4:1. Useful pigments have particle size of micrometer (micron) scale, e.g. with a nominal diameter in the range of about 0.05 to 20 microns and more typically about 0.2 to 10 microns and more preferably about 1 to 5 microns.

When the adjuvant material is particulate $TiO_2$—a commonly used pigment material with exceptionally high covering power—it has been found that 6% ATO coated onto $TiO_2$ in the weight ratio 2:3 ATO/$TiO_2$ has a CR of 1.2. When the antimony in ATO is increased to about 11 mole percent, the CR is 1.6. A number of ATO coated $TiO_2$ pigments which are commercially available as conductive metal oxide particles having from 1 to about 13% antimony are useful in the displays of this invention. For instance, a light gray conductive powder comprising 12.25% ATO on 0.2 micron $TiO_2$ particles in the weight ratio of 23:77 is available from Mitsubishi Materials Company Ltd. as W-1 conducting particles. Gray conductive powders comprising 12.3% ATO on 1 to 5 micron $TiO_2$ particles in the weight ratio of 33:77 are available from E.I. Dupont de Nemours and Company under the tradenames "ZELEC®" 1410T and 3410T. Such commercially available materials having a CR of about 1.6. When the antimony is increased to 22 mole percent, the CR is surprisingly increased to a value greater than 2. Thus, one aspect of this invention provides novel ATO coated $TiO_2$ particles having a CR greater than 1.6, e.g. at least about 1.8, more preferably greater than 2.

When other pigments with less covering power than $TiO_2$ are used, e.g. ATO on aluminum borate (at a weight ratio of about 0.5), it has been discovered that doped tin oxide materials with an exceptionally high CR, e.t. up to about 4–5 can be produced. More particularly it has been discovered that certain commercially available conductive powders comprising ATO on pigments such as aluminum borate, barium sulfate zinc oxide, silica and mica, are surprisingly electrochromic. In particular, a gray conductive powder with a surprisingly high contrast ratio, i.e. greater than 4, is 11.5% ATO on 4 micron aluminum borate particles in the weight ratio of 54:46 available from Mitsui as Passtran 5210 Type V conducting particles.

The doped tin oxide materials of this invention can be obtained from commercial sources or produced by a well-known methods with appropriate adjustment in materials, e.g. dopant level and the amount and nature of adjuvant pigment, for optimal electrochromic effect. For instance, ATO-coated $TiO_2$ according to this invention can be prepared by adding an hydrochloric acid-acidified aqueous solution of antimony chloride (e.g., the trichloride or the pentachloride) and tin tetrachloride to an aqueous dispersion of $TiO_2$ particles, with simultaneous addition of sodium hydroxide to maintain pH at about 2. This process produces non-conductive metal hydroxide coated $TiO_2$ particles which are converted to conductive, doped tin oxide coated particles when heated to liberate water, e.g., in the range of 300° to 700° C.

This invention provides particulate antimony-doped tin oxide that is oxidized or reduced to provide a tin oxide compound that has a powder resistivity which is at least two times the powder resistivity of a base antimony tin oxide compound. Particulate antimony-doped tin oxide is commonly made by thermally treating a mixed antimony and tin compound. For instance, antimony-doped tin oxide can also be prepared by precipitating mixed hydroxide particles from a solution of mixed antimony and tin followed by thermal treatment, preferably at a temperature greater than 350° C., to form particles of base antimony tin oxide compound. The electrical resistivity of base ATO depends on a number of variables, e.g. particle size and level of antimony dopant, and can typically range from 0.05 to 10 ohm-cm. With such a wide range of base powder resistivity it is expected that there can be some overlap with the range of increased resistivity for oxidized or reduced tin oxide compounds. It has been found that the powder resistivity is increased more substantially when the doped tin oxide is reduced rather than oxidized. For instance, as shown in the following examples, a commercial ATO having a powder resistivity of 0.12 ohm-cm can be reduced to provide a powder resistivity of about 400 ohm-cm or oxidized to provide a powder resistivity of about 5 ohm-cm. With heat treatment the powder resistivity can be returned to a value in the range of the original. When such a base antimony-doped tin oxide is oxidized or reduced there is provided a resistive, particulate antimony-doped tin oxide that is characterized as having a powder resistivity which is at least two times the powder resistivity of said base antimony tin oxide compound. Preferably such resistive, particulate antimony-doped tin oxide particles will have a nominal dimension in the range of 0.2 to 10 micrometers. Such resistive particulate doped tin oxide being oxidized or reduced will also exhibit desirable electrochromic properties.

When the electrochromic doped metal oxide materials of this invention are used in electrochromic display devices, such materials are typically disposed in a laminate structure, e.g. a layer of electrochromic material in contact with a layer of ion-supplying electrolyte. Alternatively, displays can be fashioned by providing a layer comprising electrochromic particles in a electrolyte matrix. Commonly, an electrical potential is applied across the materials by electrochromic material and electrolyte. Such electric potential causes ions, such as protons, lithium ions or sodium ions, to migrate into or out of the electrochromic material, causing the electrochromic effect-generating reduction or oxidation. Useful electrochromic displays can be prepared using the electrochromic doped tin oxide materials of this invention by following the display fabrication principles set forth in my earlier U.S. Pat. No. 5,413,739 (which is herein incorporated by reference) or other principles apparent to those skilled in the art.

This invention also provides electrochromic devices useful for displays. Such devices preferably comprise a layer of electrochromic material in contact with an ion-supplying electrolyte layer. In one preferred embodiment the layer of electrochromic material comprises high contrast, electrochromic, doped metal oxide such as doped tin oxide as disclosed herein and dispersed in a transparent or translucent polymer matrix in an amount such that the material is electrically conductive. The polymer of the matrix can comprise any of a variety of common polymers, e.g. preferably a non-brittle polymer such as a tough elastomeric or rubbery polymer such as nitrile rubber, butyl rubber or butyl acrylate, that is amenable to incorporation of dispersed particles of this invention. The polymer matrix can be ionically isolative, e.g. a butyl rubber, or tonically conducting, e.g. a sulfonated polymer such as sulfonated polystyrene or Nafion ionomer. The electrolyte layer is also desirably transparent or, at least, translucent. While the ion-supplying electrolyte material can comprise a salt dissolved in an aqueous or organic solvent-containing polymeric gel, a preferred electrolyte material is an tonically conductive, aqueous polymeric gel which can contain a humectant or hygroscopic filler. Useful hygroscopic material includes deliquescent material such as lithium chloride, calcium chloride, glycerine, sodium dihydrogen phosphate or lithium trifluoromethyl-sulfonate. A preferred aqueous polymeric gel is polyacrylamidomethyl-propanesulfonate, known as POLYAMPS.

In such electrochromic devices the electrochromic metal oxide material serves as an electrode for transporting electrons into or out of the ionically conductive electrolyte media. Concurrent with such electron transfer is the movement of ions across an interface between said layer of electrochromic material and said ion-supplying electrolyte layer. In preferred embodiments of this invention the electrodes can be side by side electrodes as disclosed in my earlier U.S. Pat. No. 5,413,739. Such side by side electrodes are located behind, e.g. hidden by, the electrochromic layer of the device.

In order for such electrodes to function, they must be connected to an electrical potential by current feeders, e.g. conductive leads, which can comprise any of a variety of conductive materials such as silver ink, carbon ink, metal oxide ink or deposition where the metal oxide is a conductive metal oxide such as ATO. Alternatively, the electrodes can be in a sandwich disposition such that at least one of the electrodes should be of transparent or translucent material to allow observation of the electrochromic effect. Such transparent electrode material is preferably a conductive metal oxide such as ATO. When used as a current feeder, ATO has an optimally high conductivity in the range of 6–10% ATO. When the transparent metal oxide electrode is used in a sandwich type display, the current feeder is typically an integral film coating. It is believed that ATO in a film form, as compared to the particulate doped tin oxide materials of this invention, has such a low contrast ratio as to be considered non-electrochromic; that is, the contrast ratio is less that 1.2.

It has also been discovered that doped conductive metal oxides containing dopants other than antimony and niobium that have heretofore been believed not to have useful electrochromic properties can be prepared in forms having sufficiently high contrast ratios (i.e., greater than 1.2, and preferably greater than 1.4) for use in electrochromic displays. Such materials include tin-doped indium oxide, mixed tin(II)-tin(IV) tin oxide, and fluorine-doped tin oxide in precipitated or particulate form. Contrast ratios of up to 1.7 can be obtained from these materials. Commercial ITO (tin-doped indium oxide) powder samples were found to have greater contrast ratios when smaller crystalline sizes were used, while a co-precipitate of hydrated tin and indium oxides, when dried, produced a tin-doped indium oxide having a contrast ratios that varied depending upon the pH of the solution from which the hydrated oxides were precipitated, and the drying temperatures used.

In one significant aspect of the present invention, displays have also been produced by preparing high surface area conductive metal oxides such as ATO on silica or alumina substrates, dispersing these in polymer binders and coating them onto the surface of an electrode such as printed silver-carbon. When two of these electrodes are immersed in an electrolytic solution and a DC voltage applied, color changes are observed, beginning with voltages as low as 0.1 V. When the charge versus voltage behavior of these electrodes is measured using a PAR electroanalytical system, it has been observed that the voltage on the electrodes is essentially a linear function of the amount of charge supplied thereto through a range of voltage within which the display is electrochromically active, and that the optical effect is an essentially linear function of the applied voltage.

Figure 2:
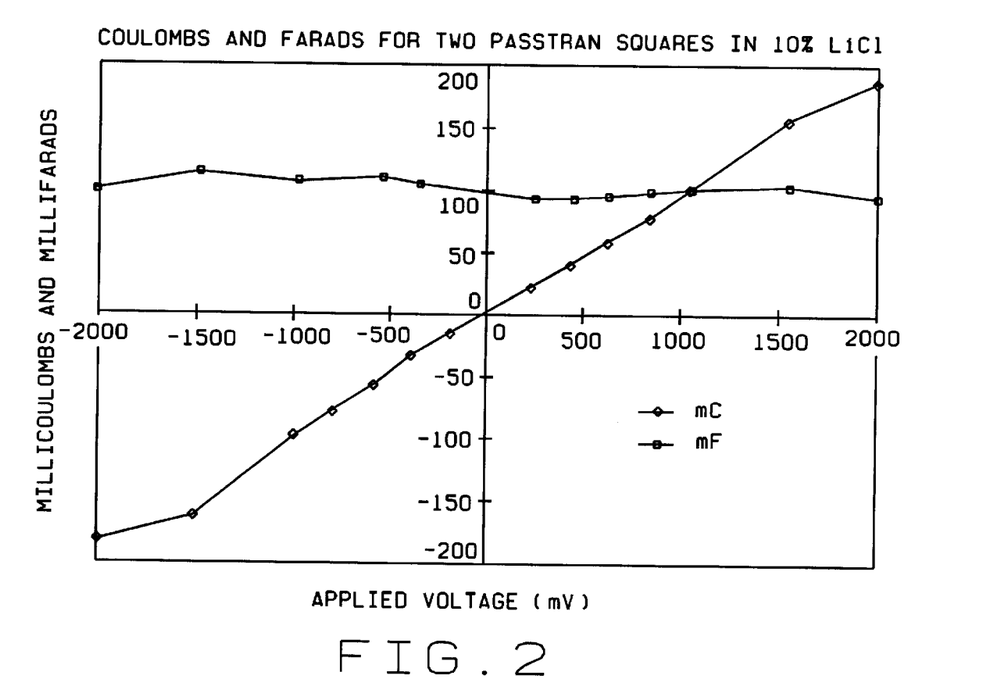
FIG. 2 is another graph showing the relationship of injected charge to voltage applied to an electrochromic display prepared from Mitsui Passtran 5210.
Figure 14:
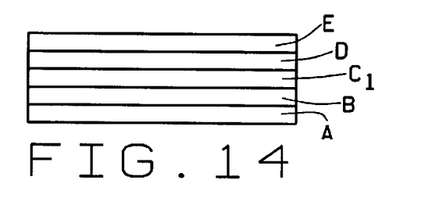
FIGS. 14–19 are partial side views of laminates useful as electrochromic displays utilizing the various electrochromically active materials described herein.
Figure 15:
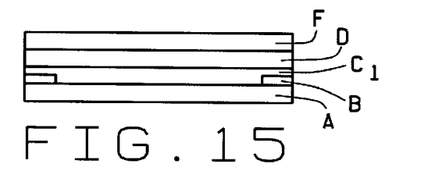

Among the structures in which the inventive electrochromically active materials may be used in this device are a variety of laminates in FIGS. 14–19.These laminates comprise a substrate A, e.g., a non-conductive layer of polyethylene terephthalate (PET) film, coated with a conductive layer B of one or more electrodes, e.g., metal, metal oxide, conductive polymer or carbon. Layer $C_1$ may comprise one of the electrochromically active materials disclosed herein in an electrically conductive, electrochromic composite layer comprising a dispersion of electrically conductive electrochromic particles dispersed in a polymer matrix. Layer $C_2$ is an electrically conductive, essentially ionically isolative composite layer comprising a dispersion of electrically conductive (non-electrochromic) particles dispersed in a polymer matrix. Layer $C_3$ is a layer of electrochromic material. Layer D is an ionically conductive layer, e.g., POLYAMPS gel. Transparent conductor layer E, e.g., an ITO coated film, can serve as an electrode and transparent, insulating layer F, e.g., a PET film, can serve to prevent loss of electrolyte from the conductive layer. With reference to FIG. 14, an electric potential between electrodes B and E will create an electrochromic effect at the interface of layers $C_1$ and D. FIG. 2 illustrates a display having side-by-side electrodes B, on substrate A. Because the conductivity of the electrochromic composite layer $C_1$ is lower than the conductivity of the ionically conductive layer D, current will preferentially flow from one electrode through the electrochromic composite layer to the tonically conductive layer to the area above the next electrode where it will pass in a reverse direction through the electrochromic layer to the second electrode. Where the electrochromic material changes color with the loss of an anion, the electrochromic effect will be visible over one electrode. Where the electrochromic material changes color with both the gain and the loss of an anion, electrochromic effects will be visible over both electrodes.

Figure 16:
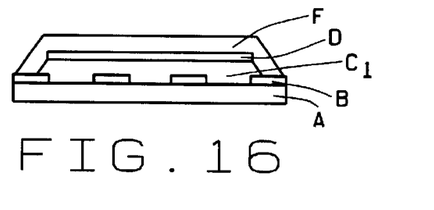
Figure 17:
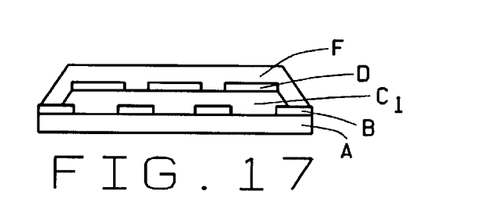
Figure 18:
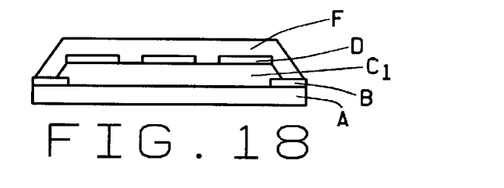
Figure 19:
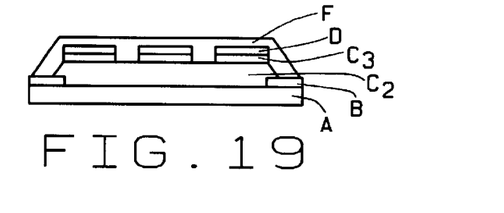

FIGS. 16, 17, 18, and 19 illustrate bipolar electrodes. In FIGS. 16 and 17, an electrical potential difference across the outer electrodes will generate bipolar potential differences at different halves of the intermediate electrodes so as to create opposite electrochromic effects in the interface of layers $C_1$ and D over the bipolar charged ends of each intermediate electrode. In FIG. 18, the opposite electrochromic effects are created at the interface between layers $C_1$ and D under the edges of the segmented electrolyte layer D. In FIG. 19, the opposite electrochromic effects are created at edges of segmented sections creating the interface of electrochromic layer $C_3$ and the ionicallly conductive layer D.

While the following examples illustrate the preparation and use of various embodiments of the electrochromic doped tin oxides and electrochromic displays of this invention, it should be clear from the variety of the examples herein that there is no intention of so limiting the scope of the invention. On the contrary, it is intended that the breadth of the inventions illustrated by reference to the following examples will apply to other embodiments which would be obvious to practitioners in the electrochromic arts.

EXAMPLE 1

This example illustrates one embodiment of an electrochromic device according to this invention using commercially available ATO coated $TiO_2$ particles. 1.5 grams (g) of light gray conductive powder comprising 12.25% ATO on 0.2 micron $TiO_2$ particles in the weight ratio of 23:77 from Mitsubishi Materials Company Ltd and identified as W-1 conducting particles was dispersed in 5 g of a 10% solution of styrene-butadiene-styrene (SBS) rubber in toluene. A copper coated polyester film was used as a electrode substrate. The dispersion was coated as a film onto the copper layer and dried with a heat gun to evaporate the toluene solvent. The coated substrate was immersed in an aqueous electrolyte solution comprising 5% sodium sulfate. With the application of 1 to 2 volts, the coating turned a visibly darker gray color than the original color of the coating. Reversing the polarity cause a rapid reversal to a lighter gray color that was visibly lighter than the original color of the coating.

EXAMPLE 2

This example illustrates the fabrication of an electrochromic display device. A first display conductor pattern was printed in the shape of a 25 millimeter (mm) square centered on a supporting substrate of polyester film with a narrow conductor lead running from the 25 mm square to the edge of the polyester substrate. A counter electrode conductor was printed in the shape of a 12 mm wide line bordering the square pattern and lead at a distance of about 1 millimeter from the edge thereof. Each conductor pattern was printed with a conventional silver ink and coated with a conventional carbon ink. An electrochromic display was fabricated by overcoating the conductor pattern with a dispersion of 12% ATO-coated $TiO_2$ in a solution of fluorinated elastomer; the 12% ATO-coated $TiO_2$ was obtained from Mitsubishi Materials Company Ltd. and is characterized as light gray conducting powder having a particle size of 0.2 micron with ATO and $TiO_2$ present in the weight ratio of 23:77. The fluorinated elastomer was dissolved at 22 weight percent (wt%) in butoxyethyl acetate. Sufficient ATO coated powder was dispersed in the elastomer solution so that the weight ratio of ATO-coated powder to elastomer was 2.5:1. The conductor pattern was coated with the dispersion except for the lead portions thereof at the edge of the substrate where electrical connections could be made. The dispersion coating was dried at 130° C. for 10 minutes, recoated with dispersion and redried to provide an electrically conducting, essentially pin hole-free coating of light gray-colored, electrochromic, doped tin oxide particles dispersed in a transparent, tonically insulating elastomer matrix, designated as a "basic ATO-coated display element". The electrochromic layer of the basic ATO-coated display element was covered with a stack of adhesive polyester gaskets to provide an electrolyte well over the electrode area; the well was about 1 millimeter (mm) in depth and was filled with electrolyte comprising an aqueous solution of 30 wt % lithium chloride and 5 wt % acrylic polymer thickener, i.e. Acrysol ASE-95 from Rohm and Haas Company. The electrolyte filled well was sealed with adhesive polyester film to complete the construction of electrochromic display device designated D1.

EXAMPLE 3

This example illustrates the measurement of contrast ratios for electrochromic doped tin oxides operating in an electrochromic effect-generating environment. The conductor leads of the electrochromic display device D1 prepared in Example 2 were connected to a function generator which applied a 50 milliHertz, ±1.5 volt square wave potential to drive the electrochromic device causing the electrochromic ATO-coated particles visible through the electrolyte coating to cycle between a light gray and a dark gray color as the ATO was sequentially oxidized and reduced. The magnitude of the contrast ratio of the color change was determined by fitting the device under a microscope fitted with a Melles-Griot photodiode and wide band width amplifier and measuring the output in millivolts corresponding to the light and dark state. The ratio of millivolts measured in the light state divided by millivolts measured in the dark state provided the measure of "contrast ratio" or "CR" as used herein. The electrochromic, 12% ATO-containing material in the device exhibited a contrast ratio of 1.38.

EXAMPLE 4

This example illustrates the dramatic effect of an increased amount of antimony in electrochromic properties of ATO. A basic ATO-coated display element prepared according to Example 2 was coated with additional electrochromic dispersion and fabricated into an electrochromic display in essentially the same manner of Example 2 except for the use of 33% ATO. The contrast ratio measured in the manner of Example 3 was 1.92.

EXAMPLE 5

This example further illustrates the dramatic effect of an increased amount of antimony in electrochromic properties of ATO. A set of basic ATO-coated display elements prepared according to Example 2 were coated with an additional electrochromic dispersion and fabricated into an electrochromic display in essentially the same manner of Example 2 except that the doped tin oxide comprised antimony in the range of 11 to 60 percent and that the ATO and $TiO_2$ were in the weight ratio of 36:64. The contrast ratio measured in the manner of Example 3 is reported in Table 1.

TABLE 1

| % Sb | CR |
| --- | --- |
| 5.7 | <1.2 |
| 11 | 1.6 |
| 23 | 2.0 |
| 33 | 2.14 |
| 43 | 2.19 |
| 47 | 2.17 |
| 55 | 1.74 |
| 60 | 1.94 |

EXAMPLE 6

This example illustrates the dramatic increase in electrochromic effect achieved by selection of substrate pigment. An ATO-coated display element prepared similar to the procedure of Example 2 was further coated with an electrochromic dispersion of 12% ATO-coated onto aluminum borate (obtained from Mitsui as Passtran 5210 conductive powder) in a fluorocarbon elastomer solution. In the dried electrochromic top coat the weight ratio of ATO-containing particles to fluorocarbon elastomer was 28:15. An electrochromic device prepared as in the manner of Example 2 and evaluated in the manner of Example 3 showed that the doped tin oxide on an aluminum borate substrate had a contrast ratio of 5.14.

EXAMPLE 7

This example illustrates the preparation of an electrochromic, niobium-doped tin oxide according to this invention. A barium sulfate slurry was provided by dispersing 50 g of barium sulfate powder in 750 ml of water and heating to 75° C.; the slurry was adjusted to pH 12 with 25% sodium hydroxide solution. A tin solution (98.5 g of sodium stannate trihydrate in 250 ml of water at 75° C.) was added to the slurry. After stirring for 30 minutes, an acidic niobium solution (0.735 g niobium trichloride in 25 ml methanol acidified with 270 cc of 20% sulfuric acid) was added to the tin oxide-containing slurry over a 90 minute period. The pH of the niobium/tin-containing slurry was adjusted to 2.5 with 20% sulfuric acid. After 3 hours the solution was cooled and filter washed 10 times with 250 ml of water, providing particles that were dried in a vacuum oven at 130° C. The dried particles were calcined for 2 hours under nitrogen at 450° C. to provide electrochromic 0.72% niobium-doped tin oxide coated barium sulfate substrate particles having a contrast ratio of 1.54.

EXAMPLE 8

This example illustrates the utility of mixtures of doped tin oxide particles and pigment particles as an electrochromic material. A mixture of 0.4 g of 13.4% ATO particles (commercially available from DuPont as "ZELEC®" 3010XC ATO) and 0.15 g of $TiO_2$ particles was dispersed in 1 g of 22 wt % fluoroelastomer solution in butoxyethyl acetate to provide a dispersion suitable for use in an electrochromic display as described herein. The material exhibited a contrast ratio of 2.4.

EXAMPLE 9

This example illustrates the high resistance of oxidized or reduced doped tin oxide particles according to this invention. "ZELEC" 3005XC ATO obtained from DuPont was determined to have a base ATO powder resistivity of 0.12 ohm-cm. The base ATO was treated with sodium borohydride, washed and dried to provide reduced ATO (having 0.58% sodium ions) having a powder resistivity of 404 ohm-cm. The base ATO was treated with ammonium persulfate to provide oxidized ATO having a powder resistivity of 5.5 ohm-cm. When the oxidized ATO is heated, the powder resistivity returns to a value close to 0.1 ohm-cm.

EXAMPLE 10

Figure 1:
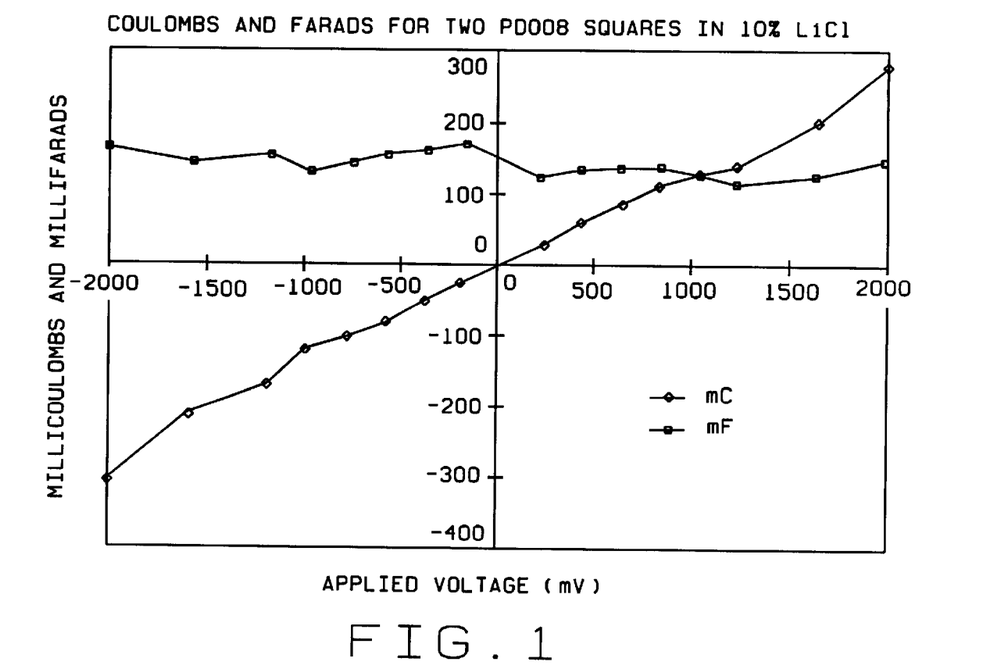
FIG. 1 is a graph showing the relationship of injected charge to voltage applied to an electrochromic display containing an ink prepared from ATO.

This example illustrates the linear relationship between charge and voltage in an electrochromic device made with ATO in accordance with this invention. FIG. 1 shows charge and capacitance versus applied voltage for two 2"×2" test electrodes printed with silver, carbon, Mitsubishi W-1 and Acheson PD008 (an ink prepared from 75% ATO and 25% silica, with 43 mole percent Sb and 57 mole % Sn in a fluorelastomer binder) and immersed face to face about 2 cm apart in a beaker containing 10% LiCl solution in water. The leads of the test electrodes were attached to a power supply, and the test electrodes equilibrated at 25 mv for 20 seconds before each data point was run. Values of applied voltage ranged from −1.0 volt to +1.0 volt in 100 mv steps. FIG. 1 shows both a plot of charge vs. voltage and a plot of capacitance vs. voltage for the test electrodes. The injected charge is a close approximation to a straight line function of voltage within the range of −2V to +2V, which means that the capacitance of the device is nearly constant over an unusually wide range of voltages. Electrochromic switching of this display requires voltages of only ±1.3v, which is well within the linear charge-voltage relationship.

EXAMPLE 11

Figure 3:
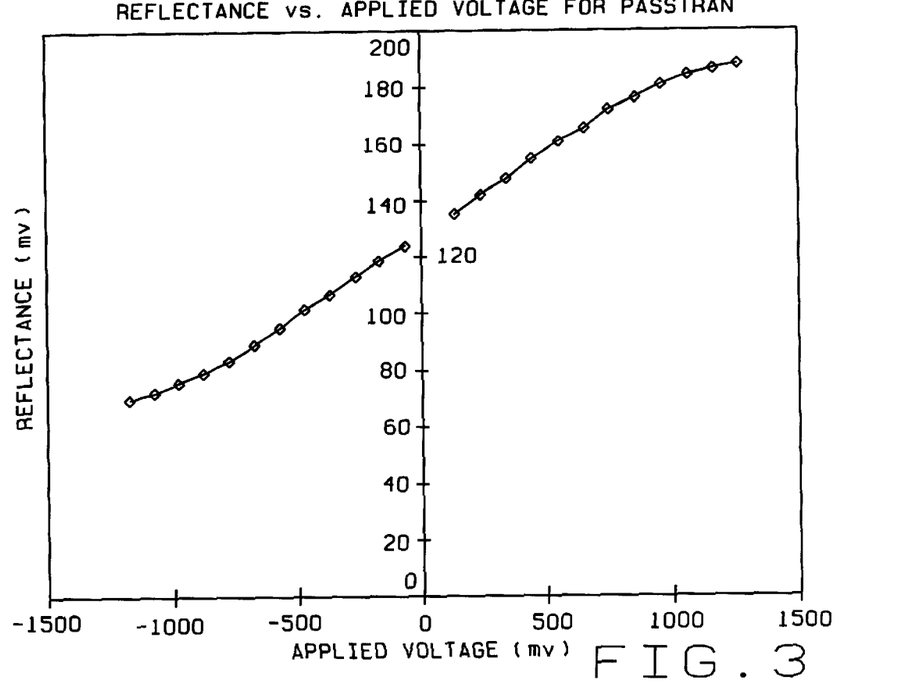
FIG. 3 is a graph showing the relationship of applied voltage to reflectance as measured by a photodiode for the display prepared from Mitsui Passtran 5210.

This is an example of a capacitor-like charge and voltage relationship in which a linear electro-optic effect is also demonstrated in an electrochromic device using Passtran 5210 in accordance with this invention. FIG. 2 shows behavior similar to that of Example 10 (i.e., a similar linear relationship between voltage and charge and a nearly constant capacitance over a ±2.0 volt range) for a display prepared from Mitsui Passtran 5210, albeit with somewhat lower capacitance than that of Example 10. FIG. 2 is a plot of data obtained from test electrodes immersed in beakers, as in Example 2. FIG. 3 is a plot showing the reflectance of a test display prepared from Mitsui Passtron 5210, in accordance with a method similar to that used to make the device in Example 2 with reflectance measured in accordance with the technique of Example 3. A linear relationship between applied voltage and reflectance is evident over a range from approximately −1.0 volt to +1.0 volt, producing a contrast ratio range of greater than 2.0 within the linear range.

EXAMPLE 12

Figure 4:
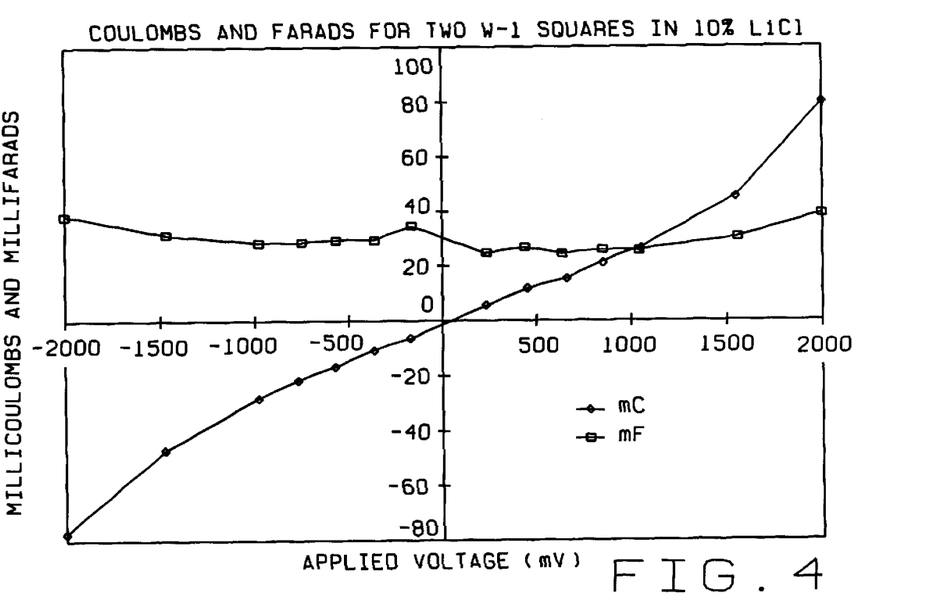
FIG. 4 is a graph showing the relationship of injected charge to voltage applied to an electrochromic display comprising two W-1 squares in a 10% LiCl solution.

This is an example of a capacitor-like charge and voltage relationship in an electrochromic device using Mitsubishi W-1 in accordance with this invention. FIG. 4 show behavior similar to that of Example 10 (i.e., a similar linear relationship between voltage and charge over a range of ±2.0 volts) for a display prepared from Mitsubishi W-1, albeit with somewhat lower capacitance than that of Example 9.

Aside from the results shown in Examples 10–12, it is expected that capacitor-like charge and voltage relationships should be obtained from a wide range of materials other than ATO. Requirements for such a relationship to exist are that the material have relatively high electric conductivity (e.g., powder resistivity of less than 1,000 ohm-cm), high surface area (e.g., at least 10 $m^2$/g or higher, the value 10 $m^2$/g being obtained from commercially available materials, with values up to 160 $m^2$/g obtained from materials made in laboratory experiments), a balance of visible absorption versus light scattering behavior such that distinctly different colors are observed for "oxidized" versus "reduced" forms of the powder, and an electrochemically accessible potential range sufficiently wide that oxidation and reduction may be carried out without encountering interfering Faradaic reactions.

EXAMPLE 13

Figure 5:
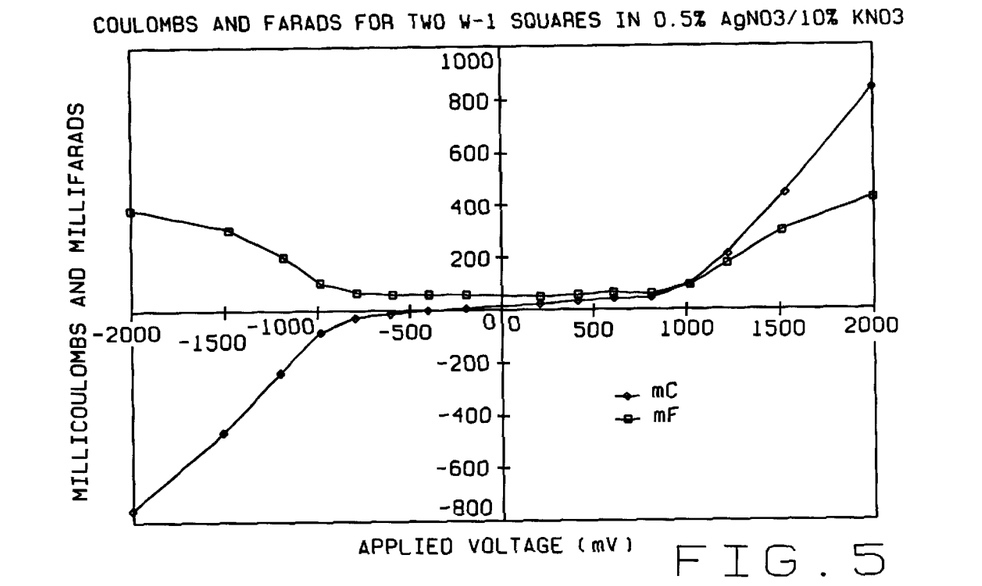
FIG. 5 is a graph showing the relationship of injected charge to voltage applied to an electrochromic display comprising two W-1 squares in 0.5% $AgNO_3$/10% KCl solution.
Figure 6:
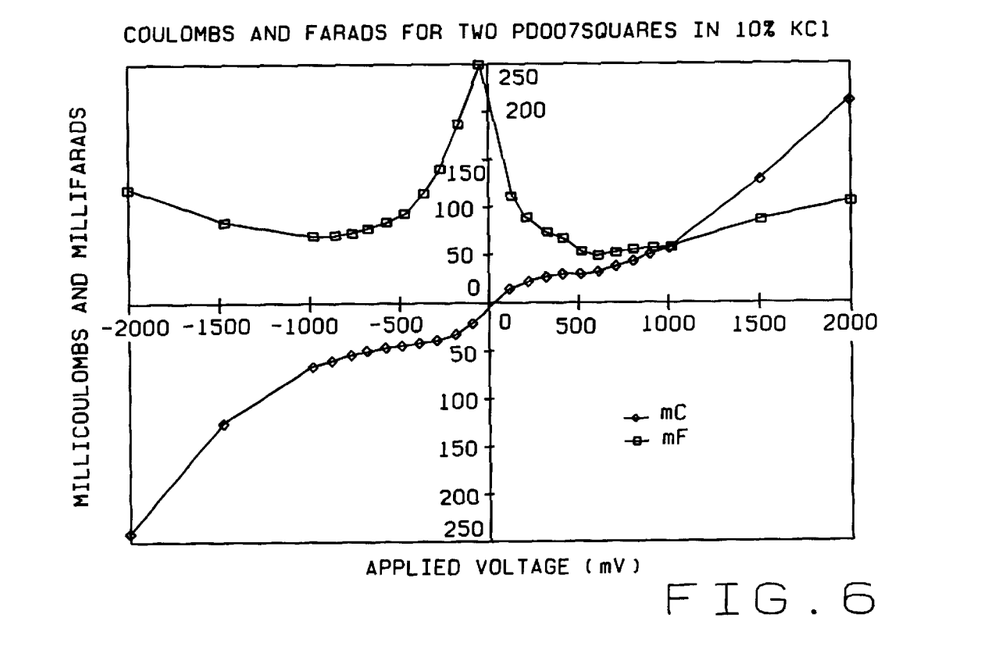
FIG. 6 is a graph showing the relationship of injected charge to voltage applied to an electrochromic display comprising two PD007 squares in 10% KCl solution.

FIGS. 5 and 6, respectively, show a distinctly nonlinear relationship between charge and voltage when a Faradaic component is added to the device of Example 10. Specifically, FIG. 5 shows the nonlinear relationship between voltage and charge when silver ion is present in a test performed with two squares coated with W-1 ink in a 10% $KNO_3$ solution, and FIG. 6 shows the nonlinear relationship when Prussian blue PD007 is used as an ink on two squares in a 10% KCl solution. Silver ion introduces a Faradaic reaction into the test, thereby producing different values of capacitance at negative potentials. FIG. 6, in which PD007 Prussian Blue is printed on two test squares shows distinctly non-linear charge to voltage characteristics, resulting in a peak capacitance at about −100 mv. These nonlinear relationships stand in contrast to the capacitor-like behavior shown in Examples 10, 11, and 12.

EXAMPLE 14

Figure 7:
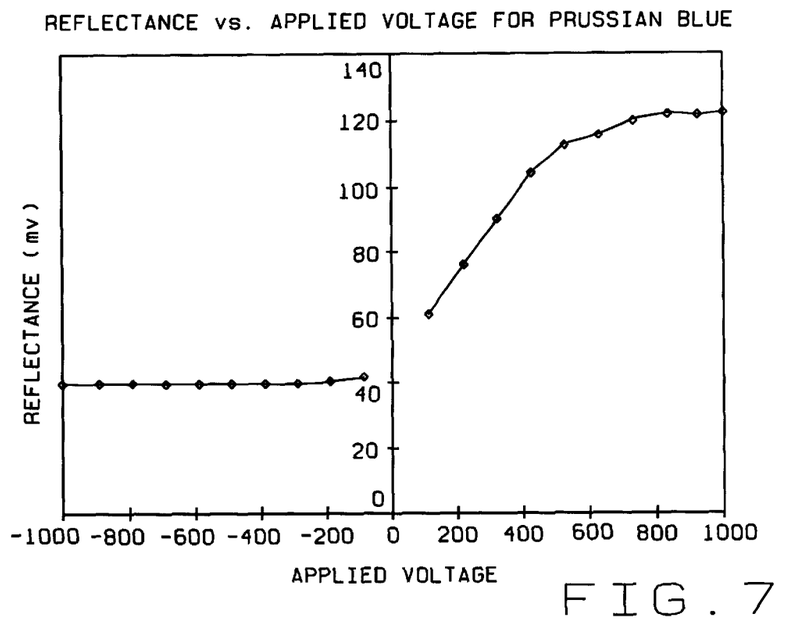
FIG. 7 is a graph showing the relationship of applied voltage to reflectance as measured by a photodiode for an electrochromic display comprising a Prussian blue ink.

A test display was prepared using 2.6% Prussian Blue on Dupont 1703S (ATO-silica) in accordance with the testing method of Example 2, and reflectance was measured in accordance with Example 3. The resulting reflectance vs. applied voltage relationship is plotted in FIG. 7. The relationship shown in FIG. 7 is linear over a range from 0 to about 400 mv, where most of the display's contrast range of greater than 2.0 is presented. Below 0.0 volts, the display exhibits a fully saturated blue color, and does not change appreciably as voltage is made more negative. While the range of voltage over which a linear relationship with the observed optical effect is limited, the display does provide a useful and substantially linear contrast change within the limited range of voltage.

EXAMPLE 15

Figure 8:
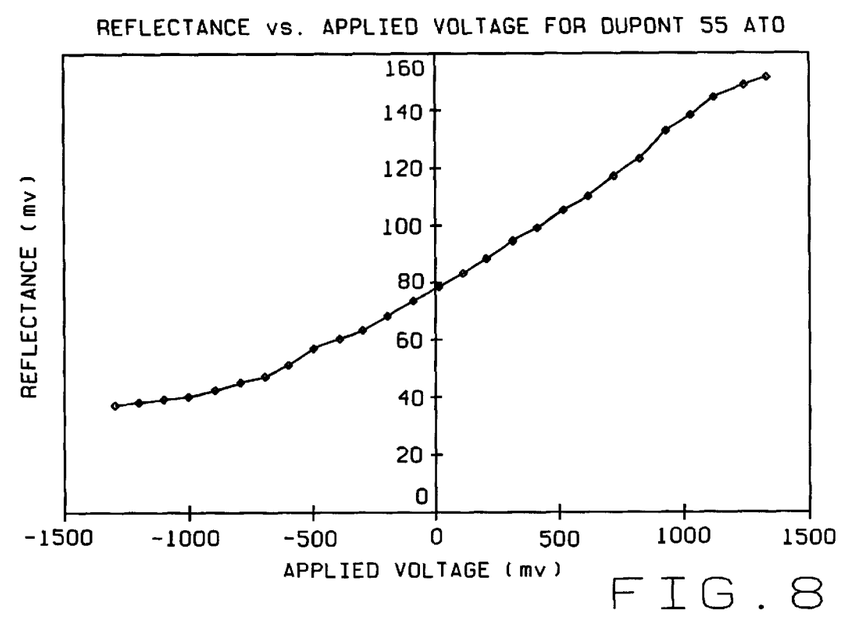
FIG. 8 is a graph showing the relationship of applied voltage to reflectance as measured by a photodiode for an electrochromic display comprising a duPont 55 ATO-based pigment.

A test display using duPont 55 [75 wt % ATO (43 mole % Sb, 57 mole % Sn)+25 wt % silica shells] was prepared in accordance with the method in Example 2 and tested in accordance with the method of Example 3. A plot of the results showing reflectance vs. applied voltage is provided in FIG. 8. This plot shows a substantially linear characteristic over approximately a 2.0 contrast ratio for applied positive voltages of 0.0 volt to 1.0 volt, with some deviation from linearity at negative voltages.

EXAMPLE 16

Figure 9:
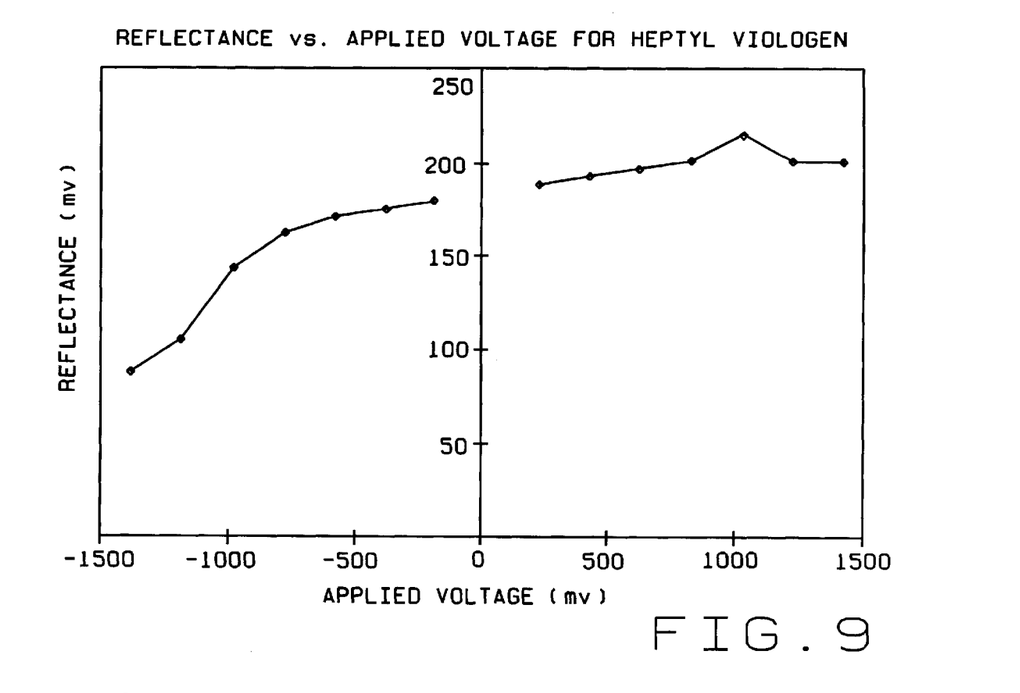
FIG. 9 is a graph showing the relationship of applied voltage to reflectance as measured by a photodiode for an electrochromic display comprising heptyl viologen.

A test display was prepared using W-1 squares in a 5% heptyl viologen solution in 10 wt. % $NH_4NO_3$ water solution. (The heptyl viologen produces a Faradaic reaction, resulting in a nonlinear relationship between charge and voltage.) The test display was prepared in accordance with the method of Example 2, and tested in accordance with the method of Example 3. A plot of reflectance vs. applied voltage is provided in FIG. 9. From +1.0 volt down to −0.75 volt, the display produces relatively little contrast change. Only below -0.75 volt does a substantial contrast change occur, and the contrast change does not appear to be linearly related to the applied voltage, which is to be expected in electrochromic displays in which Faradaic reactions occur.

EXAMPLE 17

This example shows a non-antimony doped electrochromic metal oxide that was previously thought not to exhibit useful electrochromic behavior. In this example, three commercial ITO (tin-doped indium oxide) powder samples were made into inks with fluoroelastomer binder solution, as discussed previously, and coated onto printed test electrodes. The electrolyte used was 25% LiCl-5% ASE-95 (Rohm & Haas polyacrylate). The applied voltage was ±1.5 volts AC square wave at 50 milliHertz (mHz)—i.e., 10 second pulses of alternating polarity. The contrast ratio of the inks was observed to increase with decreasing crystalline size of the ITO crystallites, as summarized in Table 2. (Crystallite size was determined via X-ray diffraction).

TABLE 2

| Sample | Color at −1.5 v | Color at +1.5 v | Contrast Ratio | Crystallite size |
|---|---|---|---|---|
| Mitsui Passtran ITO | Blue | Greenish Yellow | 1.7 | 143Å |
| Sumitomo ITO Spheres | Blue | Greenish Yellow | 1.4 | 295Å |
| Sumitomo ITO Needles | Olive-Yellow | Olive-Yellow | 1.1 | 511Å |

EXAMPLE 18

This example illustrates a method of preparing tin-doped indium oxide that exhibits a substantial electrochromic effect. Tin-doped indium oxide was produced by co-precipitation of the hydrated oxides from a mixed solution of $SnCl_2$ (10 mole %) and $InCl_3$ (90 mole %) in aqueous HCl, neutralized to pH 6.5. After filtering and drying, the hydrated oxide was fired at various temperatures. Contrast ratios were satisfactory, with higher contrast ratios being obtained when the co-precipitate was fired at lower temperatures and for shorter times. The results are summarized in Table 3.

TABLE 3

| Sample (drying temp./time) | Color at −1.5 v | Color at +1.5 v | Contrast Ratio | Powder Resistivity (ohm-cm at 12K psi) |
|---|---|---|---|---|
| 400° C./3 hr. | Blue | Yellow-Orange | 1.4 | 3.5 |
| 600° C./3 hr. | Blue | Yellow-Orange | 1.4 | 2.3 |
| 850° C./4 hr. | Blue | Yellow | 1.2 | 1.8 |

EXAMPLE 19

This example illustrates a method of preparing tin-doped indium oxide that exhibits a substantial electrochromic effect. Samples were again prepared in accordance with the method of Example 15, except that an increased amount of $SnCl_2$ was used (25 mole % $SnCl_2$, 75 mole % $InCl_3$). Precipitation was at pH 10.5 rather than the pH of Example 15. Results are summarized in Table 4.

TABLE 4

| Sample (drying time/temp) | Color at −1.5 v | Color at +1.5 v | Contrast Ratio | Powder Resistivity (ohm-cm at 12K psi) |
|---|---|---|---|---|
| 400° C./3 hr | Blue | Yellow-orange | 1.5 | 16.7 |
| 600° C./3 hr | Blue | Yellow-orange | 1.5 | 2.7 |

EXAMPLE 20

This example illustrates a tin(II)-doped tin(IV) oxide on alumina that exhibits useful electrochromic properties. A mixed tin(II)-tin(IV) oxide was prepared by co-precipitating the mixed chlorides (20 mole % $SnCl_2$, 80 mole % $SnCl_4$) in aqueous HCl into a slurry of alumina (Aldrich<5 micron) at pH 2.0 using NaOH. The co-precipitate was filtered, dried and fired at various temperatures. All operations were carried out in a nitrogen atmosphere. Table 5 summarizes the results, showing satisfactory contrast ratios when firing was carried out at 400° C. and 600° C. The sample fired at 800° C. was found to be essentially nonconductive, and as such, not useful for electrochromic displays.

TABLE 5

| Sample (drying time/temp) | Color at +1.5 v | Color at −1.5 v | Contrast Ratio | Resistivity (ohm-cm at 12K psi) |
|---|---|---|---|---|
| 400° C./3 hr | light gray | dark gray | 1.4 | 6.5 |
| 600° C./3 hr | light gray | dark gray | 1.3 | 153 |
| 800° C./3 hr | — | — | — | $1.9 \times 10^6$ |

EXAMPLE 21

This example describes the preparation of a fluorine-doped tin oxide that exhibits useful electrochromic properties. Hydrated tin oxide was precipitated from a solution of $SnCl_4$ in aqueous HCl by adjusting to pH 2.0 at 90° C. with an NaOH solution. The precipitates were filtered, washed, and dried at room temperature. A first sample (a) was prepared by adding 0.5 g of $SnF_2$ to 50 ml deionized water, mixed with 5 g of the hydrated tin oxide and the mixture evaporated to dryness on a rotary evaporator. The residual solid was then heated to 600° C. for three hours. A second sample (b) was prepared by repeating the steps used to produce sample (a), but by using 0.5 g of $SnF_4$ instead of $SnF_2$. Displays were prepared as in the previous example. Results are summarized in Table 6.

TABLE 6

| Sample | Color at −1.5 v | Color at +1.5 v | Contrast Ratio | Conductivity at 12K psi |
|---|---|---|---|---|
| (a) | dark gray | light gray | 1.5 | 42.8 |
| (b) | dark gray | light gray | 1.6 | 15.3 |

EXAMPLE 22

This example illustrates the relationship between antimony dopant level and contrast ratio. To prepare a sample of ATO on alumina that was 75 wt % ATO (43 mole % Sb, 57 mole % Sn and 25% wt alumina), a solution of $SnCl_4.5H_2O$ (Aldrich 98%, 40 g) in distilled water (20ml) was mixed with $SbCl_5$ (Aldrich 99%, 25 g) in concentrated HCl (20 ml). Alumina (Aldrich, 10 g) was stirred with deionized water (200 ml) in a beaker and heated to 90° C. The mixed Sb/Sn chloride solution was added from a burette with concurrent addition of 15% NaOH from another burette to keep pH at 0.8–1.2 for about 45 minutes. The pH was then adjusted to 2.0, the heat turned off, and the mixture left to stir and cool down for three hours. The solids were then filtered off and washed with about 1.5 liters of water. The solids were then dried under vacuum. (Normally, this was done at room temperature, but it was also observed as part of this experiment that the samples were not affected by slightly elevated temperatures, i.e., 60° to 100° C., during drying). The dried powder was then fired in an open ceramic crucible at about 600° C. for three hours in air. Quantities of about 20 g at a time were fired to ensure uniform heating in a preheated oven. At the end of the firing time, the sample was removed from the hot oven and allowed to cool quickly in air.

Figure 10:
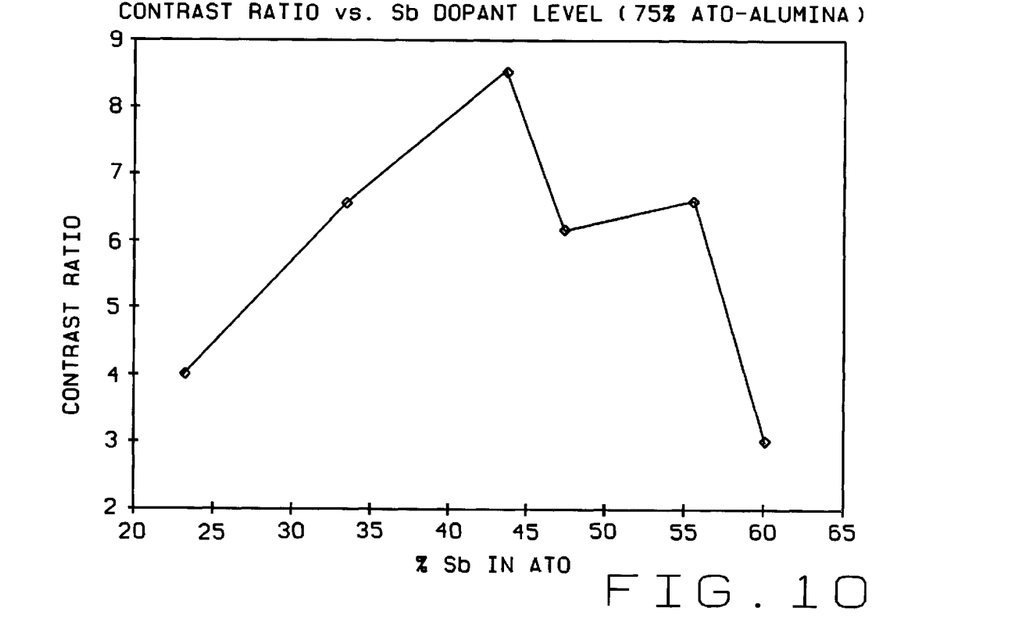
FIG. 10 is a graph showing the effect of antimony dopant level on contrast ratio.

Five other 75 wt % ATO, 25 wt % alumina samples were synthesized by this method with varying mole percentages of antimony in the ATO by varying the ratio of antimony to tin in the initial mixture. The mixtures were each made into displays in accordance with the method discussed in Example 2, and the contrast ratio of the resulting displays were measured in accordance with the method discussed in Example 3. The results are plotted in FIG. 10. It was observed that the contrast ratio is maximized at an antimony dopant percentage of about 43 mole %, and is reduced as the percentage is either increased or decreased therefrom.

EXAMPLE 23

Figure 11:
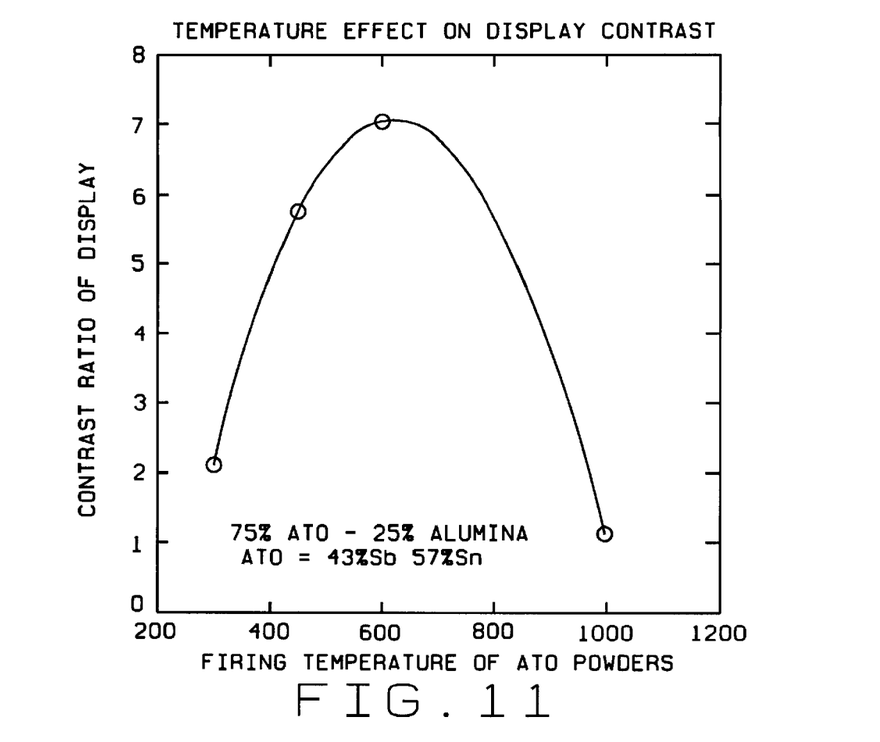
FIG. 11 is a graph showing the effect of firing temperature of ATO powders on display contrast.

This example illustrates the relationship between the firing temperature of 75 wt % ATO (43 mole % Sb, 57 mole % Sn), 25 wt % alumina powders on the contrast ratio of displays made therefrom. Four samples of ATO on alumina powders of the specified composition were prepared in accordance with the method of Example 22, except that the firing temperature was varied as indicated in FIG. 11. (All samples were fired for three hours). Each sample was made into a display in accordance with the methods of Example 2, and the contrast ratio of each display measured in accordance with the methods of Example 3. The results were plotted in FIG. 11. It was observed that the best results were obtained by firing at 600° C., although a contrast ratio of approximately 2.0 was obtained at a firing temperature of 300° C. A firing temperature of 1000° C. produced a substantially less satisfactory contrast ratio.

EXAMPLE 24

Figure 12:
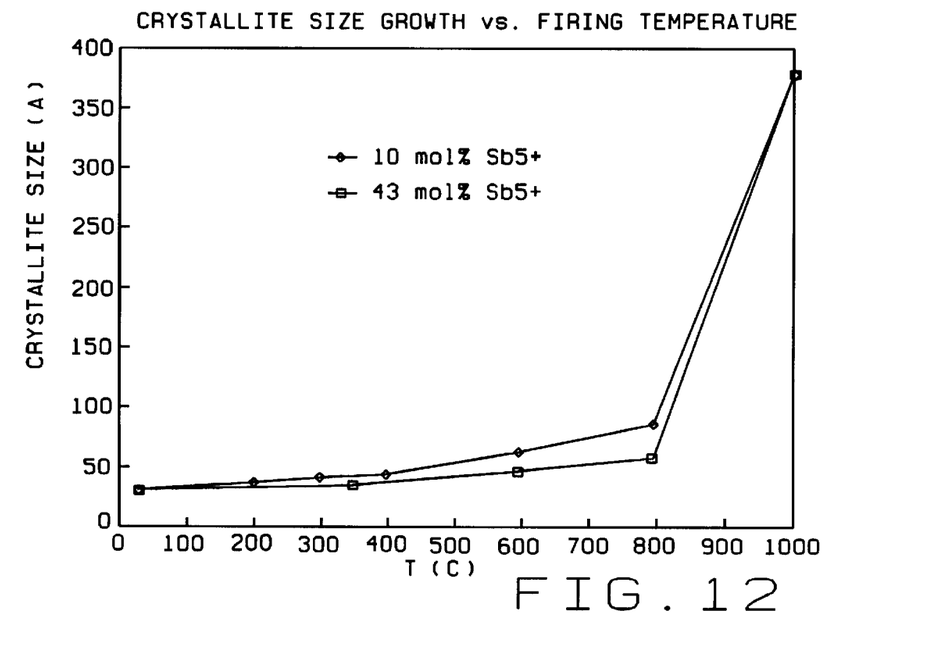
FIG. 12 is a graph showing the relationship of crystallite size growth and firing temperature.

This example shows the relationship between firing temperature of pure ATO and crystallite size. Two different samples of pure ATO were prepared in accordance with the method of Example 22, except that the ATO was precipitated without the addition of alumina. The two samples differed in that a first sample contained 43 mole % Sb, 57 mole % Sn, and the other sample contained 10 mole % Sb, 90 mole % Sn. These samples were further divided into portions, and the portions fired at various temperatures up to 1000° C. for three hours. One portion of each sample was not fired; these portions were used as the 20° C. data points. The results are plotted in FIG. 12. It was observed that the 43 mole % Sb sample had somewhat smaller crystallite size than the 10 mole % Sb sample when fired between 350° and 800° C., and that firing at 1000° C. greatly increased crystallite size of both samples. These greatly increased sizes show that the highest firing temperatures produce less satisfactory product for display use.

EXAMPLE 25

Figure 13:
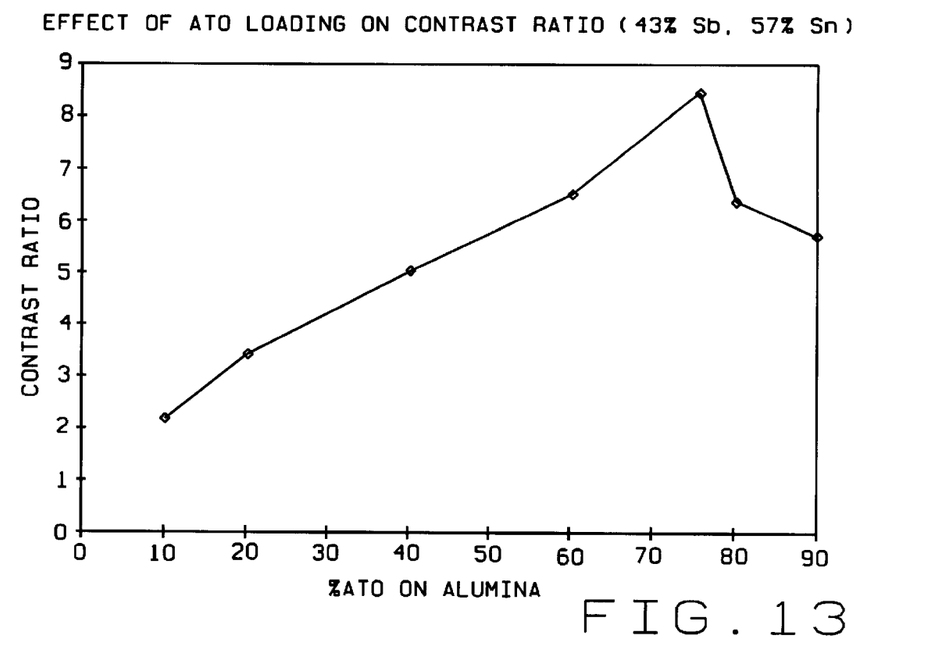
FIG. 13 is a graph showing the effect of ATO loading on contrast ratio.

This example shows the effect of varying the amount of ATO loading (43 mole % Sb, 57 mole % Sn) on alumina. Samples of ATO-alumina having this relative molar doping percentage were precipitated on alumina using the method of Example 22, but with the relative proportion of alumina varied. The resulting samples were made into displays using the method of Example 2, and the contrast ratio measured in accordance with the method of Example 3. The results are provided in FIG. 13. Although a peak in the contrast ratio was observed at 75% ATO loading, a contrast ratio of 2.0 or more was observed for all loadings between 10 wt % and 90 wt % of ATO.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A particle comprising an electrochromically activated doped metal oxide, said doped metal oxide being electrically conductive in an electrochromically unactivated state, and said activated, doped metal oxide electrochromically exhibiting a contrast ratio greater than 1.2 in comparison to the doped metal oxide in the electrochromically unactivated state.

2. A particle according to claim 1, said particle having been exposed to ion transfer in the presence of an electrochemical potential sufficient to cause a redox change in said particle, and further wherein said doped metal oxide comprises fluorine-doped tin oxide comprising an electrochemically effective amount of dopant providing a color change upon occurrence of the redox change.

3. A particle according to claim 1, wherein the metal oxide comprises indium oxide.

4. A particle according to claim 3, wherein said indium oxide is doped with tin.

5. A particle according to claim 4, wherein said particle comprises dried, co-precipitated indium and tin oxides.

* * * * *